UNITED STATES PATENT OFFICE.

EDWARD MULLER, OF NEW YORK, N. Y.

IMPROVEMENT IN THE MANUFACTURE OF BITARTRATE OF POTASSA.

Specification forming part of Letters Patent No. 217,235, dated July 8, 1879; application filed February 21, 1879.

*To all whom it may concern:*

Be it known that I, EDWARD MULLER, of New York, in the county and State of New York, have invented a new and Improved Process of Manufacturing Bitartrate of Potassa, of which the following is a specification.

Argols used in the manufacture of bitartrate of potassa (cream of tartar or cremor tartari) contain a certain percentage of tartrate of lime, usually from five to ten per cent. In the ordinary manufacture of cream of tartar from argols a chemically-pure result is not obtained, as the tartrate of lime crystallizes, and is mixed with the cream of tartar, constituting a detrimental and very objectionable impurity.

The object of my invention is, first and principally, to obtain chemically-pure cream of tartar; second and secondarily, to obtain the tartrate of lime contained in the argols for separate use in the arts. To this end I mix the argols, when partly dissolved, with hydrochloric acid, and add (after crystallization has taken place) chalk to the mother-water, thereby insuring the precipitation of the tartrate of lime.

In carrying this process into effect I proceed as follows: The argols, either crushed or not, are put in water, together with about one equivalent, by weight, of hydrochloric acid to the tartrate of lime contained in the argols. The quantity of tartrate of lime in the argols is ascertained by previous investigation. The mixture of argols, water, and hydrochloric acid is next boiled, thereby completely dissolving the argols. The hydrochloric acid insures the complete solution of the tartrate of lime, and holds it properly in suspension without attacking or affecting the cream of tartar. After boiling, the mixture is allowed to cool, to enable the cream of tartar to crystallize. The hydrochloric acid meanwhile holds the tartrate of lime suspended in solution, and prevents it from joining the crystals of cream of tartar, and insures therefore the obtainment of chemically-pure cream of tartar. The mother-water is then drawn off and chalk added thereto until effervescence, which is produced by the first addition of the chalk, ceases. The affinity of the chalk for the hydrochloric acid exceeds that of the tartrate of lime for the latter. Therefore the addition of chalk causes the tartrate of lime, and, in fact, all free tartrates, in the mother-water to precipitate.

The tartrate of lime thus obtained may be advantageously employed in the manufacture of tartaric acid.

I am aware that hydrochloric acid, together with chloride of potassium, has already been used in the solution of argols and water. This I do not claim; but I maintain that the addition of hydrochloric acid alone without chloride of potassium has a very different effect in permitting the separation of the tartrate of lime, which cannot be effected when chloride of potassium is added.

I therefore claim—

1. The process herein described of separating dissolved tartrates from water and hydrochloric acid, wherein they are dissolved, by adding chalk to the solution and precipitating the tartrates, substantially as specified.

2. The process herein described of manufacturing cream of tartar free from all impurities, consisting in adding hydrochloric acid to the solution of argols and water, and, after crystallization of the cream of tartar, adding chalk to the mother-water, substantially as and for the purposes specified.

EDWARD MULLER.

Witnesses:
A. V. BRIESEN,
T. B. MOSHER.